United States Patent [19]

Itaya

[11] Patent Number: 5,903,592
[45] Date of Patent: May 11, 1999

[54] RADIO TRANSMISSION SYSTEM

[75] Inventor: Eiji Itaya, Kawasaki, Japan

[73] Assignee: Fujitsu Limited, Kanagawa, Japan

[21] Appl. No.: 08/723,030

[22] Filed: Sep. 30, 1996

[30] Foreign Application Priority Data

Apr. 18, 1996 [JP] Japan ................................ 8-096336

[51] Int. Cl.$^6$ ................................ H04B 1/69; H04B 3/36
[52] U.S. Cl. .......................... 375/200; 375/211; 375/219;
370/315; 455/7; 455/21
[58] Field of Search .................................... 375/200, 211,
375/219, 214; 455/73, 7, 15, 20, 21, 22;
370/315

[56] References Cited

U.S. PATENT DOCUMENTS

| | | | |
|---|---|---|---|
| 4,490,818 | 12/1984 | Otsuka | 375/214 |
| 5,708,684 | 1/1998 | Ueda | 375/358 |
| 5,764,700 | 6/1998 | Makinen | 375/272 |

FOREIGN PATENT DOCUMENTS

| | | |
|---|---|---|
| 0145983 | 6/1985 | European Pat. Off. . |
| 0605182 | 7/1994 | European Pat. Off. . |
| 63-237696 | 10/1988 | Japan . |
| 63-237697 | 10/1988 | Japan . |
| 63-237698 | 10/1988 | Japan . |
| 6334598 | 12/1994 | Japan . |

*Primary Examiner*—Temesghen Ghebretinsae
*Attorney, Agent, or Firm*—Helfgott & Karas, P.C.

[57] ABSTRACT

A radio transmission system is provided which includes a master station and a plurality of series connected substations connected to the master station via a radio channel. First receiving unit receives a plurality of modulated waves which have been modulated by means of spread spectrum. Accordingly, demodulating unit may only have a capability to process a baseband signal destined therefor, in order to demodulate the modulated wave destined therefor from among the modulated waves. On the other hand, the modulated waves received by the first receiving unit are transmitted by first transmitting unit in a first transmission direction to an adjacent substation, and thus are relayed as they are without being demodulated or modulated in the middle.

11 Claims, 10 Drawing Sheets

RADIO TRANSMISSION SYSTEM

BACKGROUND OF THE INVENTION (1) Field of the Invention

The present invention relates to a radio transmission system, and more particularly, to a radio transmission system including a master station and a plurality of series connected substations connected to the master station via a radio channel.

(2) Description of the Related Art

With recent developments in mobile communications, the number of mobile terminals is rapidly increasing. To cope with an increasing number of mobile terminals and also to meet the requirements for mobile terminals, such as reduction in size and in power consumption, microcell coverages are becoming smaller and smaller, resulting in an increase in the number of base stations. As a consequence, there has been a demand for construction of short-distance, high-speed multilink communication networks for connecting a plurality of base stations and a switching station for mobile communications.

As a result of development of multimedia, such short-distance, high-speed multilink communication networks are also needed for connecting homes and hub stations. Namely, it is necessary that high-speed transmission paths should be extended to homes, and to attain this, short-distance, high-speed multilink communication networks are required.

Conventionally, in cases where wire transmission paths such as optical cable are used as multiple links of a high-speed communication network, it is almost impossible to promptly complete network installation work at low cost due to many restrictions on the occupation of roads and the use of land. For this reason, a radio transmission system is employed to implement such links.

This will be explained taking a radio transmission system for mobile communications as an example. In mobile communications, a radio transmission system is provided to connect a plurality of mobile communication base stations and a concentrator station (hub station) which connects the base stations collectively to a mobile communication switching station. Such radio transmission systems are classified into opposed type and multidirectional type. In the opposed type, the concentrator station is provided with independent antennas or radio devices arranged so as to be opposed to respective base stations. Accordingly, if the number of base stations is increased, various problems arise in respect of installation space for antennas, installation cost, frequency allocation, mutual interference, etc. In the multi-directional type, on the other hand, the concentrator station is equipped with a wide-angle directional antenna or non-directional (omnidirectional) antenna, instead of antennas opposed to respective base stations, and communications are performed by means of time-division multiplexing techniques such as TDMA. Thus, even if the number of base stations is increased, the multidirectional type is free from problems associated with the opposed type, that is, problems about installation space for antennas, frequency allocation, and mutual interference. However, the wide-angle directional antenna or the non-directional antenna is expensive, and because of scattering of transmission energy, it has low antenna gain, making it necessary to increase the transmission output correspondingly. Increasing the transmission output leads to an increase in the cost of radio devices and heat generation.

In these types of radio transmission system, the concentrator station transmits and receives radio waves directly to and from a plurality of base stations. Meanwhile, if base stations are serially connected like a chain to one another via radio channels with the base stations at opposite extreme ends connected to respective concentrator stations and a base station in the middle of the chain is designed to serve also as a relay station, then the aforementioned problems can be solved. As such radio transmission system, a conventional relay system in which a plurality of base stations are series connected to one another will be explained with reference to FIG. 10.

FIG. 10 is a block diagram showing the configuration of a conventional relay-type radio transmission system. A concentrator station 101 transmits a multiple signal at 6.3 Mbps, for example, to a base station 102 which also serves as a relay station. The 6.3 Mbps multiple signal has four slots, for example, which carry four 1.5 Mbps baseband signals to be transmitted to respective four base stations. In the base station 102, a demodulator 102a demodulates the 6.3 Mbps multiple signal to obtain four separate 1.5 Mbps baseband signals, and outputs only the baseband signal destined therefor to terminal equipment 102b. The remaining three 1.5 Mbps baseband signals are supplied to a modulator 102c, which then generates a 6.3 Mbps multiple signal while leaving one 1.5 Mbps slot vacant, and transmits the signal to a subsequent base station 103.

In the base station 103, a demodulator 103a demodulates the 6.3 Mbps multiple signal to obtain three separate 1.5 Mbps baseband signals, and outputs only the baseband signal destined therefor to terminal equipment 103b. The remaining two 1.5 Mbps baseband signals are supplied to a modulator 103c, which then generates a 6.3 Mbps multiple signal while leaving two slots vacant, and transmits the signal to a subsequent base station (not shown).

In like manner, the four base stations are successively supplied with 1.5 Mbps baseband signals respectively destined therefor.

In the conventional radio transmission system shown in FIG. 10, however, each base station must be equipped with a modulator-demodulator capable of processing a 6.3 Mbps multiple signal. In the case of the modulator-demodulator of a base station which is remote from the concentrator station 101 in particular, it is required to process a 6.3 Mbps multiple signal but in actuality handles vacant slots, which is nothing but unserviceable communication. Namely, the conventional system is associated with the problem that each base station must be equipped with a modulator-demodulator having higher capability than necessary for relaying signals. Further, a base station which is remote from the concentrator station 101 also occupies a frequency band corresponding to 6.3 Mbps, which is undesirable from the viewpoint of effective use of frequency. A problem also arises in that if a fault occurs in the modulator-demodulator of an upstream-side base station which is close to the concentrator station 101, then no signals are transmitted to the downstream-side base stations.

SUMMARY OF THE INVENTION

An object of the present invention is to provide a radio transmission system which is equipped with a modulator-demodulator capable of processing only a baseband signal destined therefor and yet can perform relay operation.

To achieve the above object, there is provided a radio transmission system having a master station and a plurality of series connected substations connected to the master station via a radio channel. The radio transmission system comprises first receiving means, provided in each of the substations, for receiving a plurality of modulated waves modulated by means of spread spectrum and sent in a first transmission direction, demodulating means, provided in each of the substations, for demodulating a modulated wave destined therefor by means of spread spectrum from among the modulated waves received by the first receiving means, and first transmitting means, provided in each of the substations, for transmitting the modulated waves received by the first receiving means in the first transmission direction to an adjacent one of the substations.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments according to the present invention will be hereinafter described with reference to the drawings.

Figure 1:
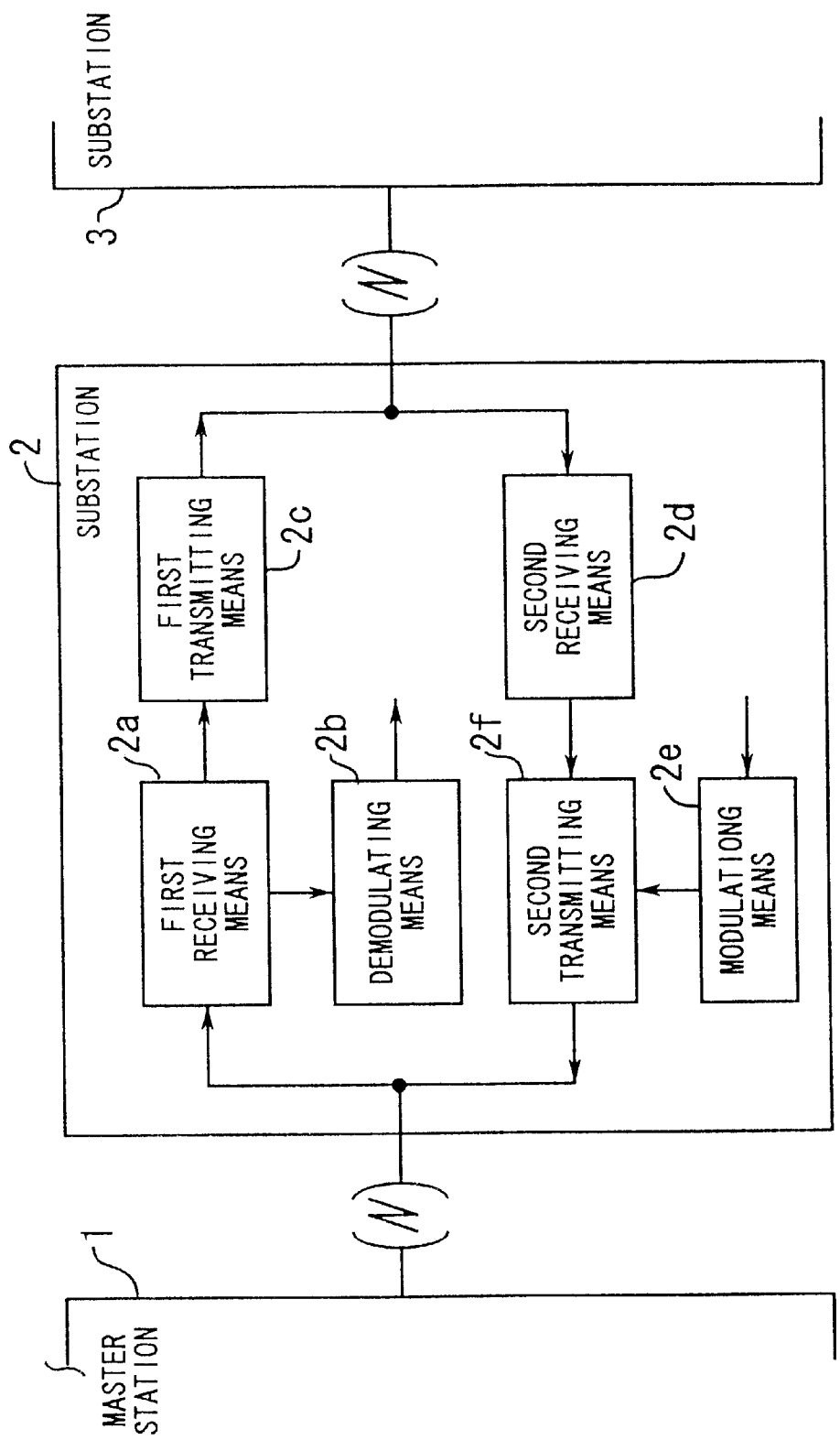
FIG. 1 is a diagram illustrating the principles of a first embodiment of the present invention.

Referring first to FIG. 1, the theoretical configuration of a radio transmission system according to a first embodiment of the present invention will be explained. The first embodiment comprises (in this case, a substation 2 is taken as an example) first receiving means 2a, provided in each of substations, for receiving a plurality of modulated waves modulated by means of spread spectrum and sent in a first transmission direction, demodulating means 2b, provided in each substation, for demodulating a modulated wave destined therefor by means of spread spectrum from among the modulated waves received by the first receiving means 2a, and first transmitting means 2c, provided in each substation, for transmitting the modulated waves received by the first receiving means 2a in the first transmission direction to an adjacent one of the substations.

The first embodiment further comprises second receiving means 2d, provided in each substation, for receiving a plurality of modulated waves modulated by means of spread spectrum and sent in a second transmission direction exactly opposite to the first transmission direction, modulating means 2e, provided in each substation, for modulating a baseband signal to be sent therefrom by means of spread spectrum, and second transmitting means 2f, provided in each substation, for transmitting, together with the modulated waves received by the second receiving means 2d, a modulated wave obtained by the modulating means 2e in the second transmission direction to an adjacent one of the substations or a master station.

The configuration according to the first embodiment will be described in more detail with reference to FIGS. 2 to 4. Correspondence of the elements shown in FIG. 1 to those shown in FIGS. 2 to 4 will be explained later following the detailed description with reference to FIGS. 2 to 4.

Figure 2:
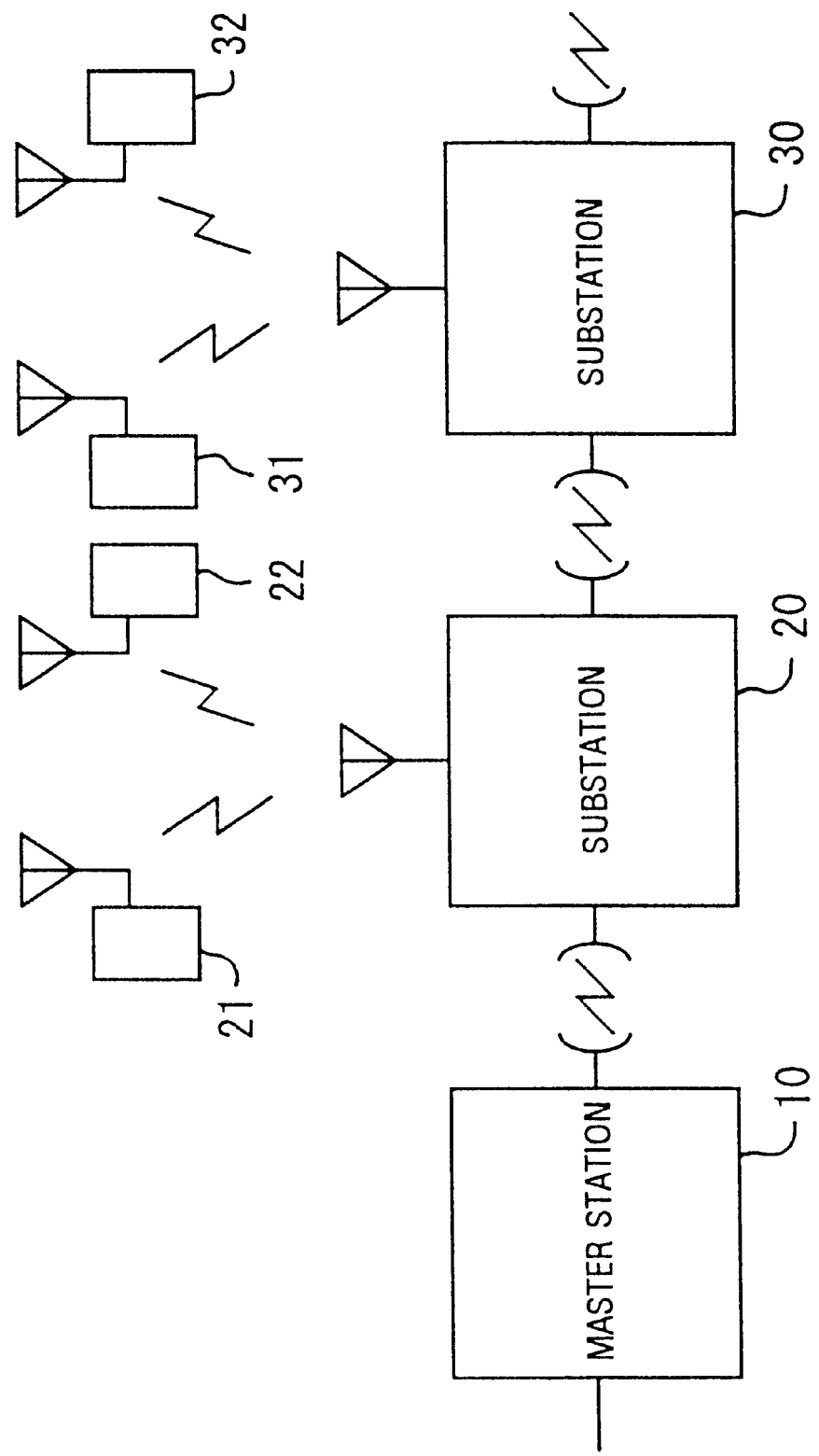
FIG. 2 is a block diagram showing the entire configuration of the first embodiment.

FIG. 2 is a block diagram showing the entire configuration of the first embodiment. In FIG. 2, a master station 10 corresponds to a concentrator station (hub station) connected to a switching station (not shown) for mobile communications, and performs transmission and reception of signals, which are modulated by means of spread spectrum (SS) techniques, with respect to a substation 20 at a relatively short distance therefrom (e.g., 100 m) in millimeter or submillimeter wave band.

The substation 20, which corresponds to a mobile communication base station, demodulates only a signal destined therefor from among the modulated signals transmitted from the master station 10 and transmits the demodulated signal by radio to mobile stations 21 and 22 present in its service zone. Simultaneously, the substation 20 relays the modulated signals from the master station 10 to a substation 30 without reproducing the signals. Also, the substation 20 modulates baseband signals from the mobile stations 21 and 22 and transmits the modulated signals to the master station 10 by radio, together with the modulated signals transmitted from the substation 30.

Similarly, the substation 30 also corresponds to a mobile communication base station, and performs transmission and reception of signals with respect to the substation 20 at a relatively short distance therefrom (e.g., 100 m) in millimeter or submillimeter wave band. The substation 30 demodulates only a signal destined therefor from among the modulated signals transmitted from the master station 10 and relayed by the substation 20, and transmits the demodulated signal by radio to mobile stations 31 and 32 present in its service zone. Simultaneously, the substation 30 relays the modulated signals, which have been transmitted from the master station 10 and relayed by the substation 20, to an adjacent substation (not shown) at a relatively short distance therefrom (e.g., 100 m) without reproducing the signals. Also, the substation 30 modulates baseband signals from the mobile stations 31 and 32 and transmits the modulated signals to the substation 20 by radio, together with the modulated signals transmitted from the adjacent substation.

Additional substations can be serially connected in the form of a chain insofar as the number (e.g., 20) allowed by the system is not exceeded. The substations to be connected are identical in arrangement and operation with the substations 20 and 30.

Figure 3:
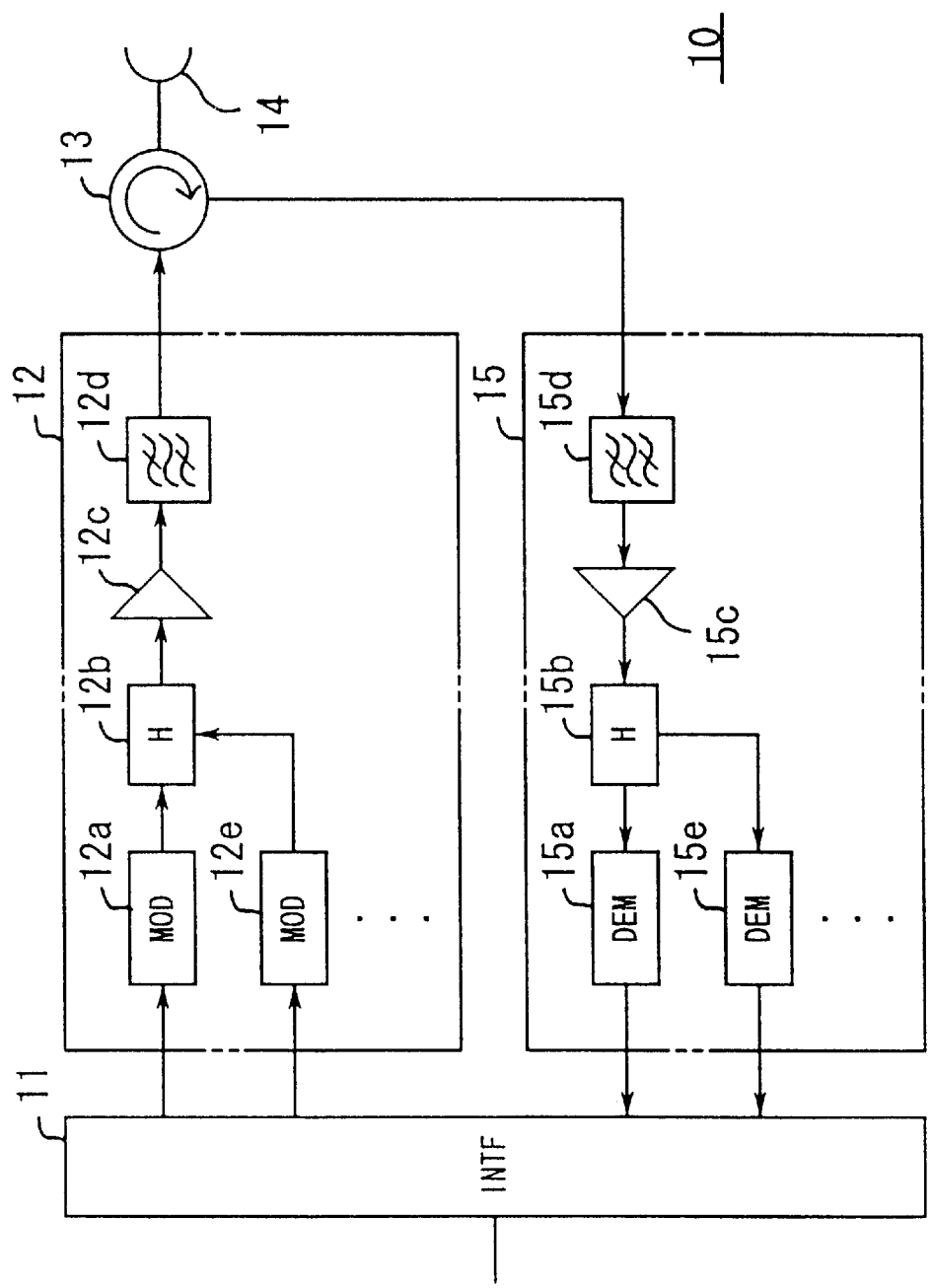
FIG. 3 is a block diagram showing the internal arrangement of a master station.

FIG. 3 is a block diagram showing the internal arrangement of the master station 10. In FIG. 3, an interface section (INTF) 11 serves as an interface for connecting a public network and this system and is connected to a switching station for mobile communications (on the left-hand side in FIG. 3). To the interface section 11 are connected a transmitting section 12 and a receiving section 15. The transmitting section 12 modulates baseband signals supplied from the interface section 11 and destined for individual substations, and transmits the modulated signals from an antenna 14 through an antenna sharing device 13 as a transmission wave. The receiving section 15 demodulates the received waves input thereto via the antenna 14 and the antenna sharing device 13, and supplies the obtained baseband signals to the interface section 11.

In the transmitting section 12, a modulating section (MOD) 12a modulates a 1.5 Mbps baseband signal supplied from the interface section 11 and destined for a first substation, by means of a spread spectrum technique using a first pattern of PN codes, and supplies the resultant RF signal to a synthesizer (H) 12b. Similarly, a modulating section (MOD) 12e modulates a 1.5 Mbps baseband signal supplied from the interface section 11 and destined for a second substation, by means of the spread spectrum technique using a second pattern of PN codes, and supplies the resultant RF signal to the synthesizer 12b. The number of modulating sections provided corresponds to the number of substations installed. The number of substations installed may be increased or decreased as desired insofar as a maximum of, for example, 20, is not exceeded. The PN codes are generated from a maximum-length code array (m array) code generator, not shown, with patterns unique to respective substations.

Figure 5:
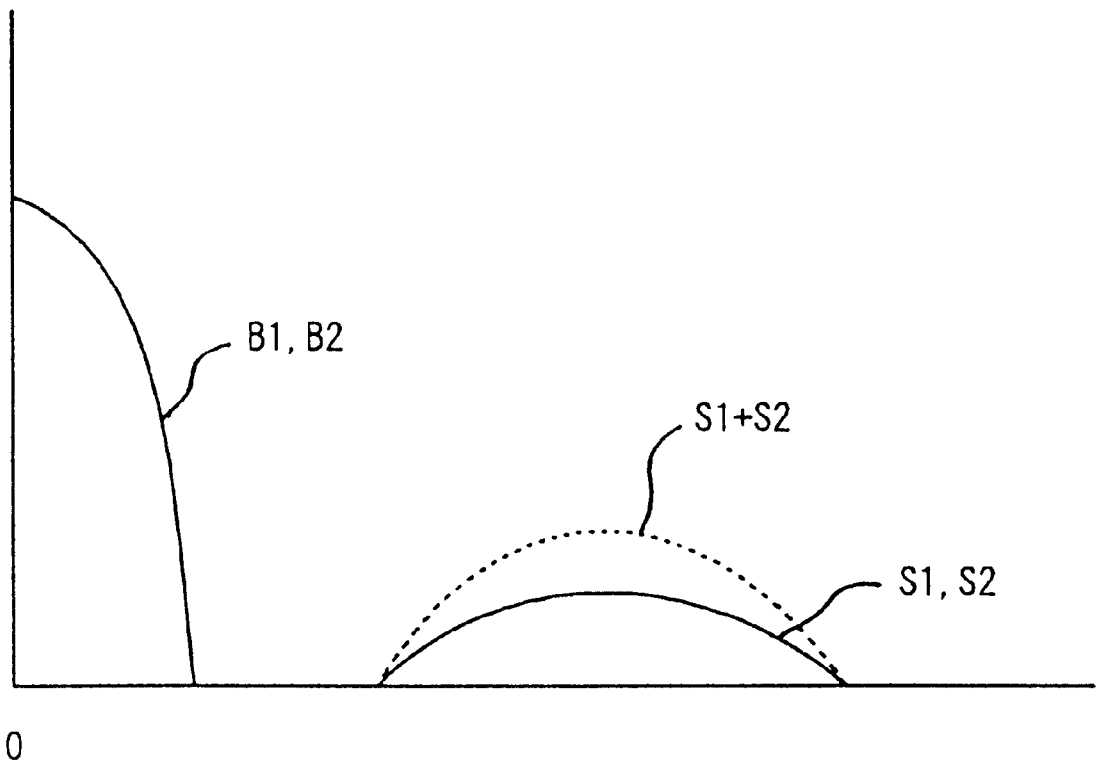
FIG. 5 is a diagram showing an RF signal and a baseband signal.

The RF signals output from the respective modulating sections are synthesized at the synthesizer 12b and supplied to the antenna sharing device 13 through a high-output amplifier 12c and a bandpass filter 12d for suppressing unwanted waves. The RF signal synthesized by the synthesizer 12b is shown in FIG. 5, in which the RF signal S1 supplied from the modulating section 12a is superposed on the RF signal S2 supplied from the modulating section 12e along the frequency axis ("S1+S2" indicated by the broken line). In FIG. 5, B1 and B2 represent the baseband signals before being modulated at the modulating sections 12a and 12e, respectively, and correspond to the RF signals S1 and S2, respectively.

In the receiving section 15, the received waves are supplied to a distributor (H) 15b through a band-limiting bandpass filter 15d and a low-noise amplifier 15c. The distributor 15b distributes the received waves to demodulating sections (DEM) 15a and 15e. The number of demodulating sections provided corresponds to the number of substations installed. The demodulating section 15a demodulates the signal supplied thereto by means of the spread spectrum technique using the first pattern of PN codes, and supplies the resultant baseband signal to the interface section 11 as a baseband signal transmitted from the first substation. Similarly, the demodulating section 15e demodulates the signal supplied thereto by means of the spread spectrum technique using the second pattern of PN codes, and supplies the resultant baseband signal to the interface section 11 as a baseband signal transmitted from the second substation. Other demodulating sections, if any, perform a similar operation. Each of the demodulating sections is required only to have a capability to demodulate a 1.5 Mbps baseband signal. According to spread spectrum techniques, signals collectively transmitted from individual substations can be reproduced separately by using different patterns of PN codes.

Figure 4:
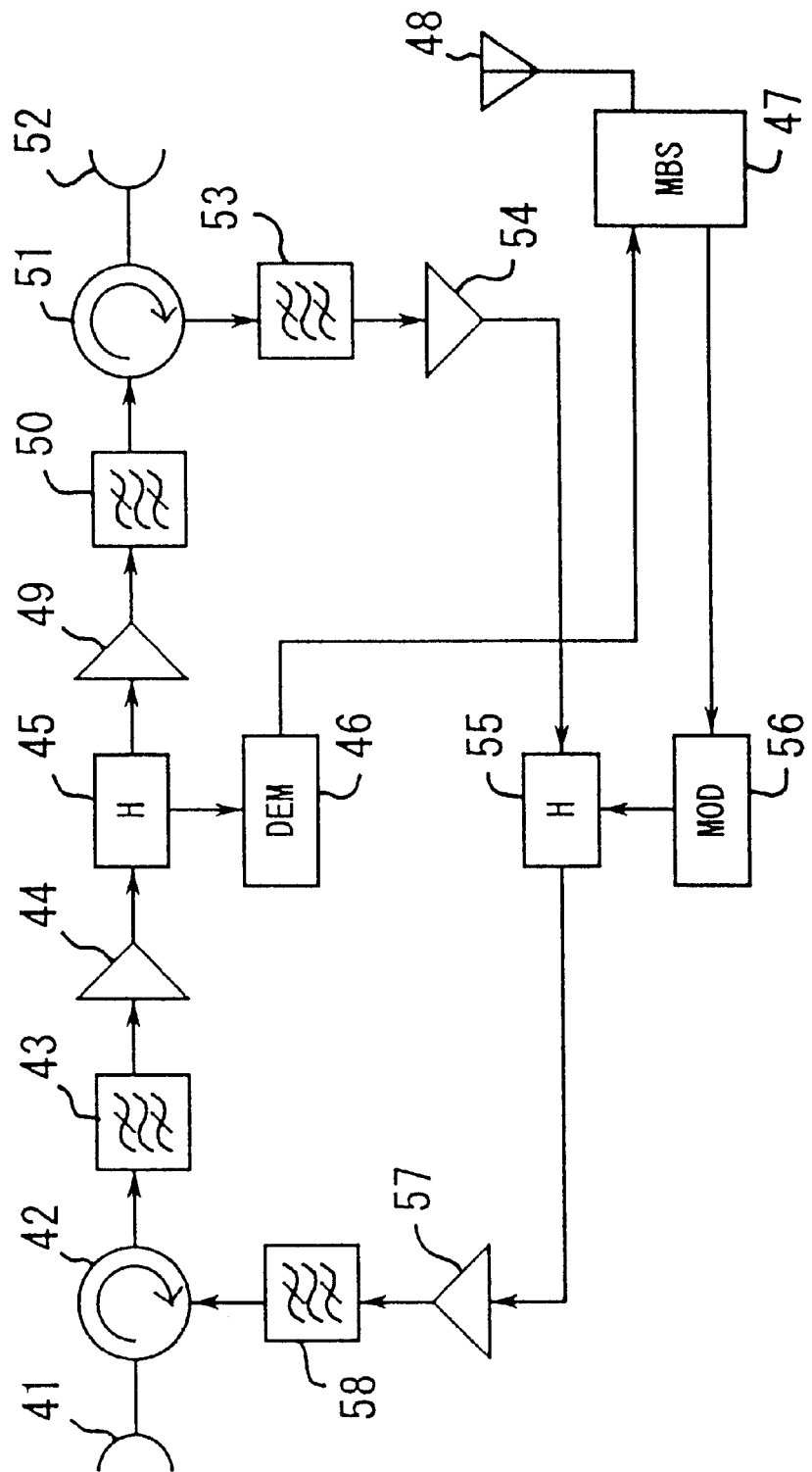
FIG. 4 is a block diagram showing the internal arrangement of a substation.

FIG. 4 is a block diagram showing the internal arrangement of the substation. All substations have an identical arrangement.

A spread spectrum signal received by an antenna 41 is supplied to a distributor (H) 45 via an antenna sharing device 42, a band-limiting bandpass filter 43 and a low-noise amplifier 44. The received signal directed in one course by the distributor 45 is supplied to a demodulating section (DEM) 46, in which the signal is subjected to spread spectrum demodulation by means of PN codes allocated to this substation and a baseband signal destined for this station is extracted and supplied to mobile communication base station equipment (MBS) 47. The mobile communication base station equipment 47 transmits by radio the baseband signal supplied thereto, from an antenna 48 to mobile stations present in the service zone of this substation.

The received signal directed in the other course by the distributor 45 is supplied to an antenna sharing device 51 via a high-output amplifier 49 and an unwanted wave-suppressing bandpass filter 50 and is transmitted from an antenna 52. Namely, the received signal directed in this course by the distributor 45 is relayed as it is without being reproduced.

A spread spectrum signal received by the antenna 52 is supplied to a synthesizer (H) 55 via the antenna sharing device 51, a band-limiting bandpass filter 53 and a low-noise amplifier 54. On the other hand, a signal transmitted from a mobile station present in the service zone of this substation is received by the antenna 48 and is demodulated by the mobile communication base station equipment 47 to obtain a baseband signal. This baseband signal is supplied to a modulating section (MOD) 56, wherein it is subjected to spread spectrum modulation by means of the PN codes allocated to this substation and then supplied to the synthesizer 55. The synthesizer 55 synthesizes the modulated signal from the modulating section 56 with the received signal which has been transmitted from other substations and have been subjected to spread spectrum modulation. The synthesized signal is supplied to the antenna sharing device 42 via a high-output amplifier 57 and an unwanted wave-suppressing bandpass filter 58 and is transmitted from the antenna 41. Namely, the signal received from other substations is relayed as it is without being reproduced.

Assuming that the baseband signal is transmitted at an information transmission rate of 1.5 Mbps, for example, and is subjected to spectrum spreading of a 1.5 GHz bandwidth in a radio frequency band of 50 GHz, the processing gain (spreading gain) Gp is obtained from 1.5 GHz/1.5 Mbps and thus its value is 1000 times as much (30 dB). On the other hand, in the case where 20 substations, for example, individually relay signals without reproducing the same as mentioned above, S/N deteriorates by 13 dB (=10 log 20), provided the same level of noise occurs in each substation. However, owing to the processing gain Gp of 30 dB, the final S/N is 17 dB (=30 dB—13 dB), ensuring sufficient S/N for the substation at an extreme end.

Where the number of substations installed is 20 and adjacent substations are 100 m apart, the distance between the master station and the extreme-end substation is about 2 km. A radio transmission system of this size can function satisfactorily even when connected to an ordinary high-speed wire transmission path etc.

Also, where the information transmission rate of the baseband signal assigned to each substation is 1.5 Mbps, 24 channels of 64 kbps telephone signals can be transmitted simultaneously. When roughly calculated, this means that 24 mobile stations present in a substation service zone of 100 m in diameter can communicate simultaneously, thus ensuring practicality.

Further, since spread spectrum is employed for the modulation and demodulation, the transmission path between any adjacent stations occupies only a band corresponding to the baseband signal destined for one substation. Accordingly, frequency can be utilized more effectively than in conventional systems. Also, no modulation/demodulation is performed when signals are relayed by each substation, and therefore, even if the modulator-demodulator of an upstream-side substation develops a fault, the downstream-side substations are never affected.

The first receiving means 2a shown in FIG. 1 corresponds to the antenna 41, the antenna sharing device 42, the bandpass filter 43 and the low-noise amplifier 44 shown in FIG. 4, the demodulating means 2b in FIG. 1 corresponds to the demodulating section 46 in FIG. 4, and the first transmitting means 2c in FIG. 1 corresponds to the high-output amplifier 49, the bandpass filter 50, the antenna sharing device 51 and the antenna 52 in FIG. 4. The second receiving means 2d shown in FIG. 1 corresponds to the antenna 52, the antenna sharing device 51, the bandpass filter 53 and the low-noise amplifier 54 shown in FIG. 4, the modulating means 2e in FIG. 1 corresponds to the modulating section 56 in FIG. 4, and the second transmitting means 2f in FIG. 1 corresponds to the high-output amplifier 57, the bandpass filter 58, the antenna sharing device 42 and the antenna 51 in FIG. 4.

A second embodiment will be now described. The second embodiment is basically identical in configuration with the first embodiment and partially differs therefrom in the arrangement of the substation. Therefore, in the following description of the second embodiment, the arrangement of the substation alone is explained, and for the other parts, reference should be made to FIGS. 2 and 3 illustrating the configuration of the first embodiment.

Figure 6:
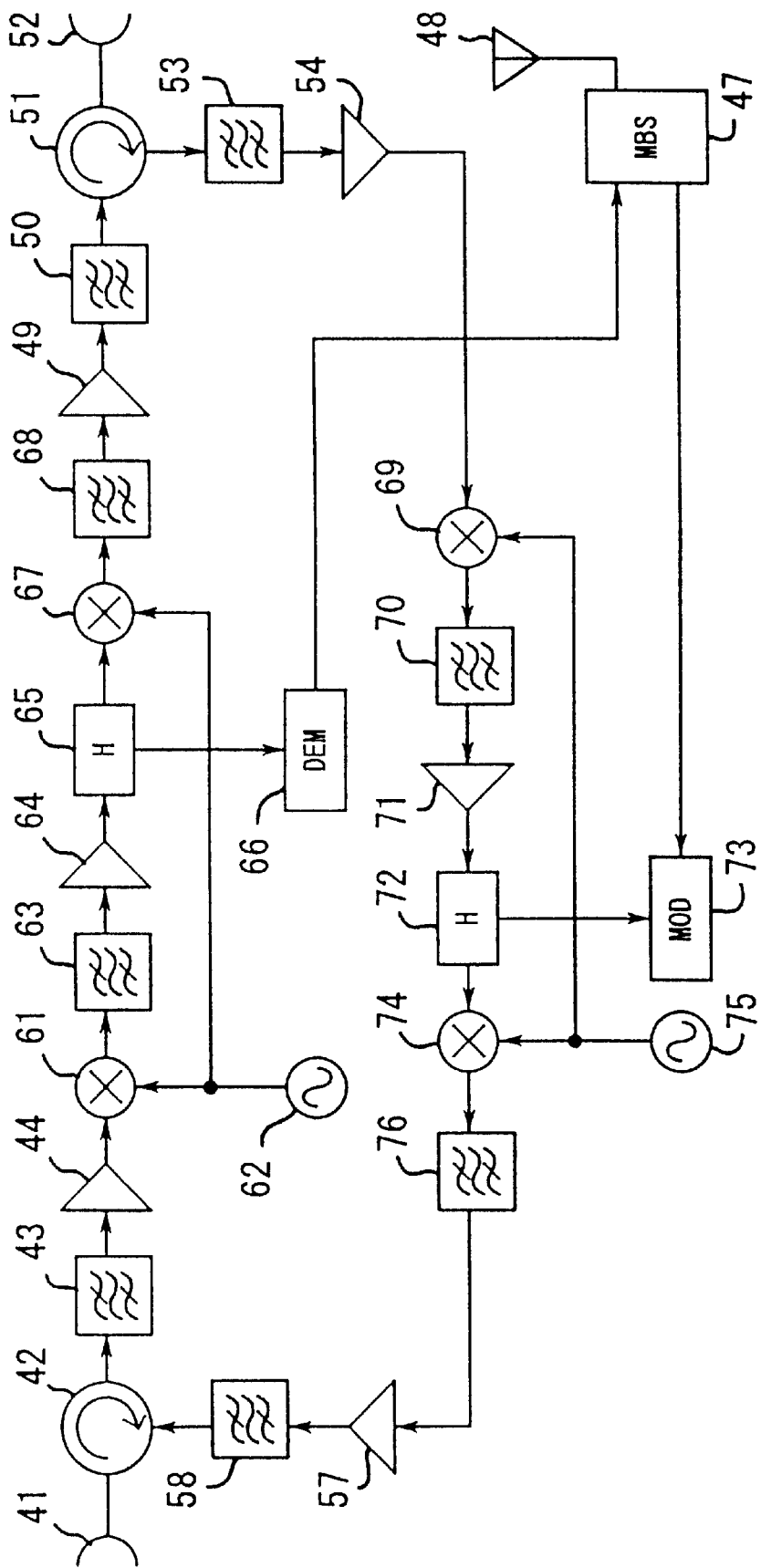
FIG. 6 is a block diagram showing the internal arrangement of a substation according to a second embodiment.

FIG. 6 is a block diagram showing the internal arrangement of a substation according to the second embodiment. Note that all substations have the same arrangement. In FIG. 6, identical reference numerals are used to denote identical elements appearing in FIG. 4 showing the internal arrangement of the substation according to the first embodiment, and description of such elements is omitted.

In the second embodiment, modulation/demodulation is performed in IF frequency band. Specifically, the RF signal output from the low-noise amplifier 44 is input to a frequency converting section 61. The frequency converting section 61 is supplied with a local oscillation signal from a local oscillating section 62, and the RF signal is subjected to frequency conversion to obtain an IF signal. The IF signal is supplied to a distributor (H) 65 through a spurious suppressing bandpass filter 63 and an IF amplifier 64. The IF signal directed in one course by the distributor 65 is subjected to spread spectrum demodulation at a demodulating section (DEM) 66 by means of PN codes allocated to this substation. The extracted baseband signal destined for this station is supplied to the mobile communication base station equipment 47. The IF signal directed in the other course by the distributor 65 is input to a frequency converting section 67. The frequency converting section 67 is also supplied with the local oscillation signal from the local oscillating section 62 and the IF signal is subjected to frequency conversion to obtain an RF signal. The RF signal is supplied to the high-output amplifier 49 through a spurious suppressing bandpass filter 68.

As described above, the demodulating section 66 is supplied with an IF signal and thus can be constructed easily by using a digital circuit, as compared with the demodulating section in the first embodiment which is designed to process RF signals of millimeter or submillimeter wave band. Accordingly, the demodulating section 66 can be reduced in cost. Low-cost substations are demanded because they are used in large quantities, and a system satisfying the demand can be provided.

The frequency converting section 67 is supplied with the same local oscillation signal from the local oscillating section 62 as that supplied to the frequency converting section 61, and the frequency converting section 61 performs RF signal-to-IF signal frequency conversion whereas the frequency converting section 67 performs inverse conversion, that is, IF signal-to-RF signal frequency conversion. Thus, even if the frequency of the local oscillation signal fluctuates, the frequency of the RF signal output from the frequency converting section 67 always equals that of the RF signal input to the frequency converting section 61.

The RF signal output from the low-noise amplifier 54 is input to a frequency converting section 69, The frequency converting section 69 is supplied with a local oscillation signal from a local oscillating section 75, and the RF signal is subjected to frequency conversion to obtain an IF signal. This IF signal is supplied to a synthesizer (H) 72 through a spurious suppressing bandpass filter 70 and an IF amplifier 71. A modulating section (MOD) 73, on the other hand, subjects a baseband signal supplied from the mobile communication base station equipment 47 to spread spectrum modulation by using PN codes allocated to this substation, and outputs the resultant modulated signal of IF band to the synthesizer 72. The synthesizer 72 synthesizes the IF signal from the IF amplifier 71 with the IF signal from the modulating section 73, and supplies the resultant signal to a frequency converting section 74. The frequency converting section 74 is supplied with the local oscillation signal from the local oscillating section 75, and performs frequency conversion on the IF signal to obtain an RF signal. The RF signal is supplied to the high-output amplifier 57 through a spurious suppressing bandpass filter 76.

As seen from above, the modulating section 73 also carries out IF band processing. Accordingly, the modulating section 73 can be easily constructed by using a digital circuit, as compared with the modulating section in the first embodiment which is designed to perform millimeter or submillimeter wave band modulation, making it possible to provide low-cost devices.

The frequency converting section 74 is supplied with the same local oscillation signal from the local oscillating section 75 as that supplied to the frequency converting section 69, and the frequency converting section 69 performs RF signal-to-IF signal frequency conversion whereas the frequency converting section 74 performs inverse conversion, that is, IF signal-to-RF signal frequency conversion. Thus, even if the frequency of the local oscillation signal fluctuates, the frequency of the RF signal output from the frequency converting section 74 always equals that of the RF signal input to the frequency converting section 69.

A third embodiment will be now described. The third embodiment is basically identical in configuration with the second embodiment and partially differs therefrom in the arrangement of the substation. Therefore, in the following description of the third embodiment, only the differences will be explained, and for the other parts, reference should be made to the description of the arrangement of the second embodiment.

Figure 7:
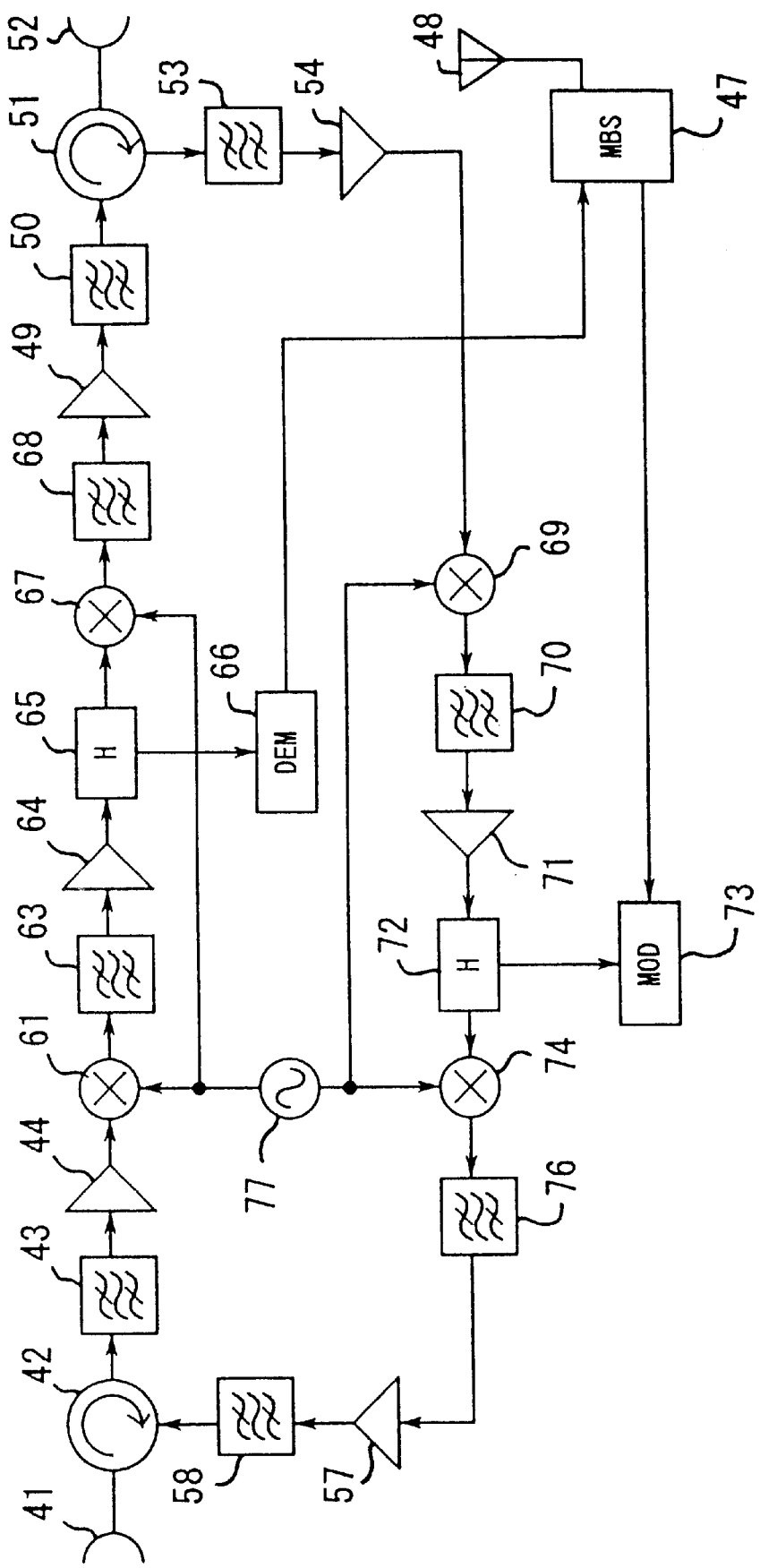
FIG. 7 is a block diagram showing the internal arrangement of a substation according to a third embodiment.

FIG. 7 is a block diagram showing the internal arrangement of a substation according to the third embodiment. In FIG. 7, identical reference numerals are used to denote elements corresponding to those appearing in the internal arrangement of the substation according to the second embodiment, and description of such elements is omitted.

In the third embodiment, modulation/demodulation is performed in IF frequency band and a local oscillating section 77 shared by the receiving and transmitting sides is provided. Also, the oscillation frequency of the local oscillating section 77 is controlled in accordance with frequency fluctuation information from the demodulating section 66. Specifically, identical local oscillation signals generated by the local oscillating section 77 are supplied to the frequency converting sections 61, 67, 69 and 74. The demodulating section 66 inherently detects fluctuations in the frequency of the carrier wave because it reproduces a carrier wave based on the received signal and performs demodulation based on the reproduced carrier. This frequency fluctuation information is supplied to the local oscillating section 77 so that the local oscillating section 77 may oscillate with its frequency stabilized by means of the frequency fluctuation information. Consequently, the local oscillating section 77 can supply the frequency converting sections 61, 67, 69 and 74 with local oscillation signals in phase with the carrier wave from the master station, and hence the transmission RF signal output from each substation has small frequency fluctuations.

As mentioned above, in the third embodiment, each substation need be equipped with a single local oscillating section, making it possible to provide low-cost substations. Also, since each substation is capable of transmission in phase with the signal transmitted from the master station, fluctuations in the frequency of the transmission RF signal output from each substation can be lessened and demodulation of such RF signals at the receiving stations is facilitated.

In the third embodiment, although the oscillation frequency of the local oscillating section 77 is controlled in accordance with the frequency fluctuation information from the demodulating section 66, the local oscillating section 77 may be simply shared by the receiving and transmitting sides instead.

A fourth embodiment will be now described. The fourth embodiment is basically identical in configuration with the first embodiment and partially differs therefrom in the arrangement of the substation. Therefore, in the following description of the fourth embodiment, only the differences will be explained, and for the other parts, reference should be made to the description of the arrangement of the first embodiment.

Figure 8:
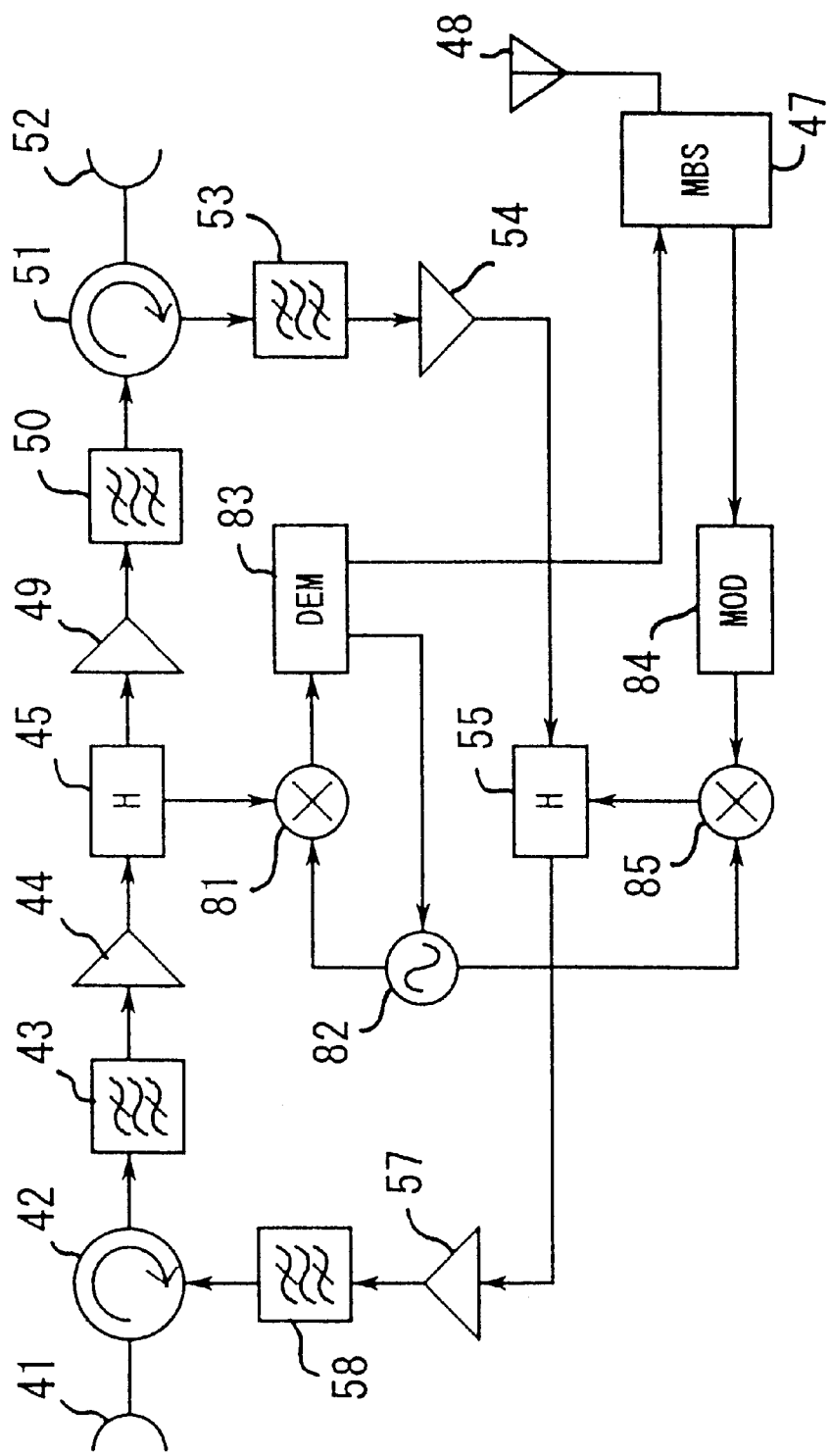
FIG. 8 is a block diagram showing the internal arrangement of a substation according to a fourth embodiment.

FIG. 8 is a block diagram showing the internal arrangement of a substation according to the fourth embodiment. In FIG. 8, identical reference numerals are used to denote elements corresponding to those appearing in FIG. 4 showing the internal arrangement of the substation according to the first embodiment, and description of such elements is omitted.

In the fourth embodiment, the received RF signal directed in one course by the distributor 45 is input to a frequency converting section 81. The frequency converting section 81 is supplied with a local oscillation signal from a local oscillating section 82, and the RF signal is converted to an IF signal by frequency conversion. A demodulating section (DEM) 83 performs spread spectrum demodulation on this IF signal by using PN codes allocated to this substation. The extracted baseband signal destined for this station is supplied to the mobile communication base station equipment 47.

On the other hand, a modulating section (MOD) 84 subjects a baseband signal supplied from the mobile communication base station equipment 47 to spread spectrum modulation by means of PN codes allocated to this substation, and supplies the resultant modulated signal of IF band to a frequency converting section 85. The frequency converting section 85 is supplied with the local oscillation signal from the local oscillating section 82, and converts the IF signal to an RF signal by frequency conversion. The RF signal is supplied to the synthesizer (H) 55.

The demodulating section 83 inherently detects fluctuations in the frequency of the carrier wave, because it reproduces a carrier wave based on the received signal and performs demodulation based on the reproduced carrier. This frequency fluctuation information is supplied to the local oscillating section 82 so that the information may be used by the local oscillating section 82 to stabilize the oscillation frequency. Consequently, the local oscillating section 82 can supply the frequency converting sections 81 and 85 with local oscillation signals in phase with the carrier wave from the master station, and hence the transmission RF signal output from each substation has small frequency fluctuations.

As mentioned above, also in the fourth embodiment, each substation need be equipped with a single local oscillating section, like the third embodiment, thus making it possible to provide low-cost substations. Also, since each substation is capable of transmission in phase with the signal transmitted from the master station, fluctuations in the frequency of the transmission RF signal output from each substation can be lessened and demodulation of such RF signals at the receiving stations is facilitated. Further, according to the fourth embodiment, the number of required frequency converting sections can be reduced by half, compared with the third embodiment.

Although in the fourth embodiment, the oscillation frequency of the local oscillating section 82 is controlled in accordance with the frequency fluctuation information from the demodulating section 83, the local oscillating section 82 may be merely shared by the receiving and transmitting sides instead.

A fifth embodiment will be now described. The fifth embodiment is basically identical in configuration with the first embodiment and partially differs therefrom in the arrangement of the substation. Therefore, in the following description of the fifth embodiment, only the differences will be explained, and for the other parts, reference should be made to the description of the arrangement of the first embodiment.

Figure 9:
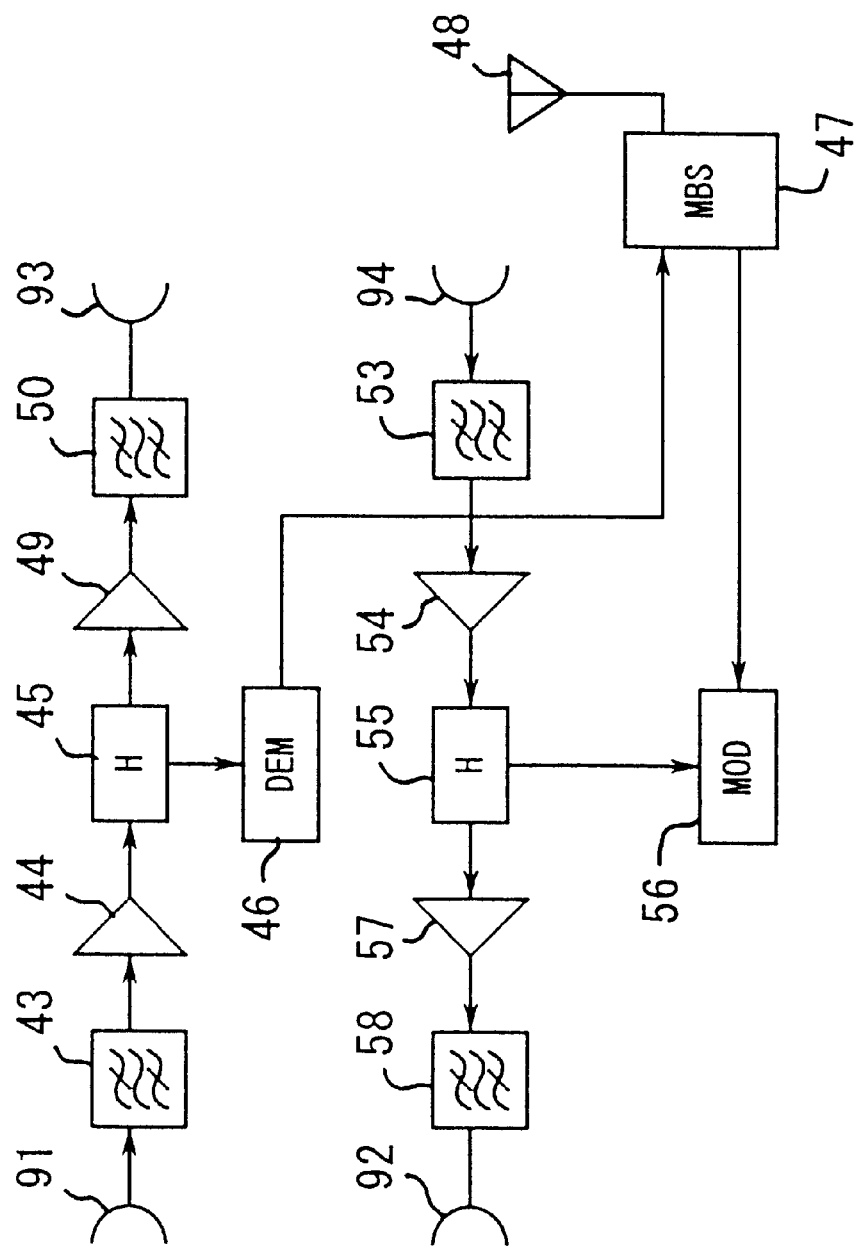
FIG. 9 is a block diagram showing the internal arrangement of a substation according to a fifth embodiment.
Figure 10:
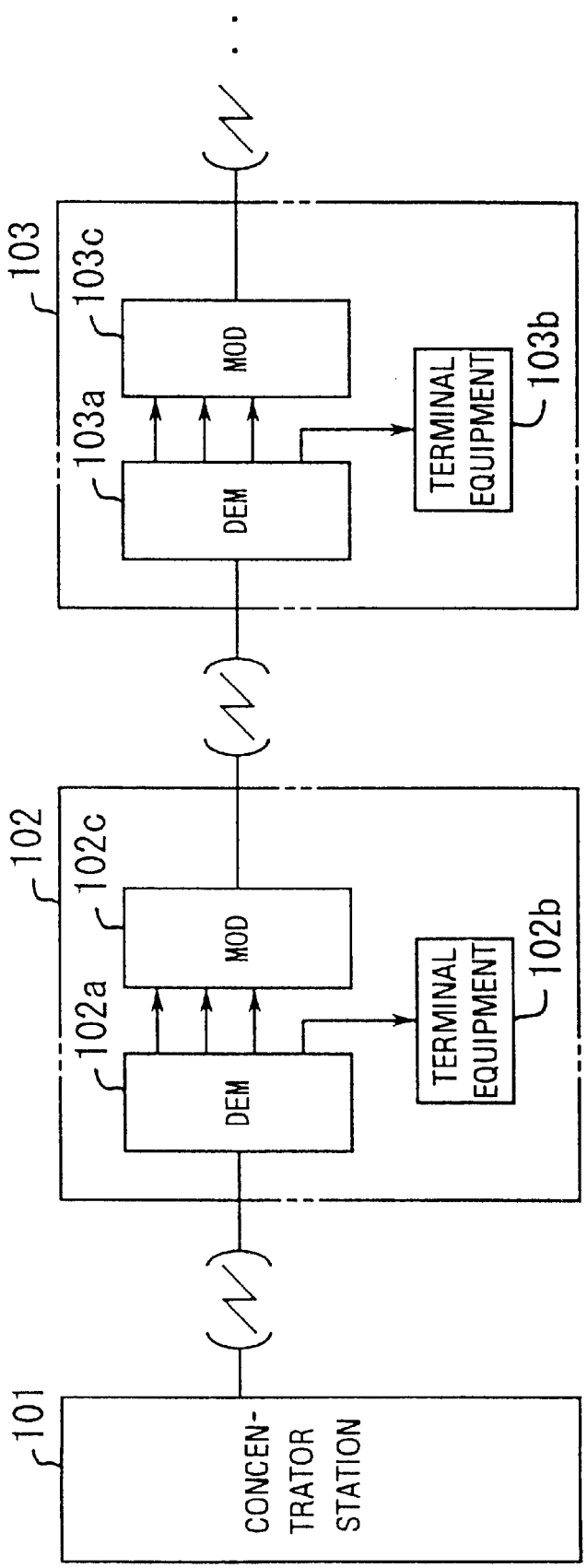
FIG. 10 is a block diagram showing the configuration of a conventional radio transmission system in which a plurality of base stations are connected in series.

FIG. 9 is a block diagram showing the internal arrangement of a substation according to the fifth embodiment. In FIG. 9, identical reference numerals are used to denote elements corresponding to those appearing in FIG. 4 showing the internal arrangement of the substation according to the first embodiment, and description of such elements is omitted.

In the fifth embodiment, the bandpass filters 43 and 58 are connected to receiving and transmitting antennas 91 and 92, respectively, instead of sharing one antenna. Similarly, the bandpass filters 50 and 53 are connected to transmitting and receiving antennas 93 and 94, respectively. Accordingly, the antenna sharing devices provided in the substation of the first embodiment are omitted.

Generally, a circulator is used as an antenna sharing device for millimeter or submillimeter wave band, but it is expensive. The antenna gain, on the other hand, is proportional to the aperture area of the antenna but is inversely proportional to the wavelength of a transmitted or received radio wave; therefore, in the case of millimeter or submillimeter wave band, even a small-sized antenna can achieve high antenna gain. Accordingly, even if small-sized antennas are used separately for transmission and reception, instead of using a single antenna for both transmission and reception, no problem arises in respect of the antenna gain. Also, since the antennas used are small in size, their influence on the cost or the installation space is small. Further, the isolation of a circulator is approximately 25 to 30 dB, and in the case of using antennas separately for transmission and reception, the degree of coupling between the antennas is smaller than this value. For these reasons, the fifth embodiment employs an arrangement in which small-sized antennas are used separately for transmission and reception and the antenna sharing devices are omitted.

Currently, plane antennas using strip lines have been put to practical use in receivers for satellite broadcasting. This technology may be applied to the fifth embodiment such that two antennas are formed on a single printed wiring board, in which case low-cost substations can be provided. Further, since no circulator is used, the substation can be easily constituted by a monolithic microwave IC (MMIC), and in this case the size and cost can be further reduced.

Although in the foregoing description, the embodiments of the present invention are applied to a mobile communication system, the invention can be applied to a high-speed multimedia communication network connecting homes and hub stations.

As described above, according to the present invention, signals modulated by spread spectrum techniques are handled; therefore, the demodulating and modulating sections are required only to have a capability to process the baseband signal destined therefor or to be transmitted therefrom, and the substation may relay signals without demodulating or modulating the same.

Further, due to the use of spread spectrum scheme, the transmission path occupied is only a frequency band corresponding to the baseband signal destined for one substation, thus permitting effective use of frequency.

Also, signals are not demodulated or modulated while being relayed, and therefore, even if the modulator-demodulator of an upstream-side base station becomes faulty, the downstream-side base stations are never adversely affected.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radio transmission system having a master station and a plurality of series connected substations connected to the master station via a radio channel, comprising:

first receiving means, provided in each of the substations, for receiving a plurality of modulated waves modulated by means of spread spectrum and sent in a first transmission direction;

demodulating means, provided in each of the substations, for demodulating a modulated wave destined therefor by means of spread spectrum from among said plurality of modulated waves received by said first receiving means;

first transmitting means, provided in each of the substations, for transmitting said plurality of modulated waves received by said first receiving means in the first transmission direction to an adjacent one of the substations, second receiving means, provided in each of the substations, for receiving a plurality of modulated waves modulated by means of spread spectrum and sent in a second transmission direction exactly opposite to the first transmission direction;

modulating means, provided in each of the substations, for modulating a baseband signal to be sent therefrom by means of spread spectrum; and second transmitting means, provided in each of the substations, for transmitting, together with said plurality of modulated waves received by said second receiving means, a modulated wave obtained by said modulating means in the second transmission direction to an adjacent one of the substations or the master station.

2. The radio transmission system according to claim 1, wherein said second transmitting means includes synthesizing means for synthesizing said plurality of modulated waves received by said second receiving means with the modulated wave obtained by said modulating means.

3. The radio transmission system according to claim 1, further comprising a first antenna provided in each of the substations and shared by said first receiving means and said second transmitting means; and a second antenna provided in each of the substations and shared by said second receiving means and said first transmitting means.

4. The radio transmission system according to claim 3, further comprising first local oscillating means, provided in each of the substations, for generating a local oscillation signal;

first converting means, provided in each of the substations, for performing radio frequency-to-intermediate frequency conversion of said plurality of modulated waves received by said first receiving means by using the local oscillation signal from said first local oscillating means;

branching means, provided in each of the substations, for directing a plurality of modulated waves output from said first converting means in two courses and supplying modulated waves of one course to said demodulating means;

second converting means, provided in each of the substations, for performing intermediate frequency-to-radio frequency conversion of modulated waves of the other course directed by said branching means by using the local oscillation signal from said first local oscillating means, and supplying converted waves to said first transmitting means;

second local oscillating means, provided in each of the substations, for generating a local oscillation signal;

third converting means, provided in each of the substations, for performing radio frequency-to-intermediate frequency conversion of said plurality of modulated waves received by said second receiving means by using the local oscillation signal from said second local oscillating means;

synthesizing means, provided in each of the substations, for synthesizing a plurality of modulated waves output from said third converting means with the modulated wave output from said modulating means; and fourth converting means, provided in each of the substations, for performing intermediate frequency-toradio frequency conversion of modulated waves synthesized by said synthesizing means by using the local oscillation signal from said second local oscillating means, and supplying converted waves to said second transmitting means.

5. The radio transmission system according to claim 1, further comprising local oscillating means, provided in each of the substations, for generating a local oscillation signal;

first converting means, provided in each of the substations, for performing radio frequency-to-intermediate frequency conversion of said plurality of modulated waves received by said first receiving means by using the local oscillation signal from said local oscillating means;

branching means, provided in each of the substations, for directing a plurality of modulated waves output from said first converting means in two courses and supplying modulated waves of one course to said demodulating means;

second converting means, provided in each of the substations, for performing intermediate frequency-to-radio frequency conversion of modulates waves of the other course directed by said branching means by using the local oscillation signal from said local oscillating means, and supplying converted waves to said first transmitting means;

third converting means, provided in each of the substations, for performing radio frequency-to-intermediate frequency conversion of said plurality of modulated waves received by said second receiving means by using the local oscillation signal from said local oscillating means;

synthesizing means, provided in each of the substations, for synthesizing a plurality of modulated waves output from said third converting means with the modulated wave output from said modulating means; and fourth converting means, provided in each of the substations, for performing intermediate frequency-to-radio frequency conversion of modulated waves synthesized by said synthesizing means by using the local oscillation signal from said local oscillating means, and supplying converted waves to said second transmitting means.

6. The radio transmission system according to claim 5, wherein said local oscillating means has a local oscillation frequency thereof controlled in accordance with a frequency deviation signal detected by said demodulating means.

7. The radio transmission system according to claim 1, further comprising local oscillating means, provided in each of the substations, for generating a local oscillation signal;

branching means, provided in each of the substations, for directing said plurality of modulated waves received by said first receiving means in two courses and supplying modulated waves of one course to said first transmitting means;

first converting means, provided in each of the substations, for performing radio frequency-to-intermediate frequency conversion of modulated waves of the other course directed by said branching means by using the local oscillation signal from said local oscillating means, and supplying converted waves to said demodulating means;

second converting means, provided in each of the substations, for performing intermediate frequency-to-radio frequency conversion of the modulated wave output from said modulating means by using the local oscillation signal from said local oscillating means; and synthesizing means, provided in each of the substations, for synthesizing a modulated wave output from said second converting means with said plurality of modulated waves received by said second receiving means, and supplying resultant waves to said second transmitting means.

8. The radio transmission system according to claim 7, wherein said local oscillating means has a local oscillation frequency thereof controlled in accordance with a frequency deviation signal detected by said demodulating means.

9. The radio transmission system according to claim 1, further comprising a first antenna provided in each of the substations and used by said first receiving means;

a second antenna provided in each of the substations and used by said first transmitting means;

a third antenna provided in each of the substations and used by said second receiving means; and a fourth antenna provided in each of the substations and used by said second transmitting means.

10. The radio transmission system according to claim 1, further comprising a plurality of master station modulating means, provided in the master station, for modulating baseband signals destined for the respective substations by means of spread spectrum;

master station transmitting means, provided in the master station, for transmitting a plurality of modulated waves obtained by said plurality of master station modulating means in the first transmission direction;

master station receiving means, provided in the master station, for receiving a plurality of modulated waves modulated by means of spread spectrum and sent in a second transmission direction exactly opposite to the first transmission direction; and a plurality of master station demodulating means, provided in the master station, for demodulating said plurality of modulated waves received by said master station receiving means by means of spread spectrum, and extracting baseband signals transmitted from the respective substations.

11. The radio transmission system according to claim 10, further comprising a master station antenna provided in the master station and shared by said master station transmitting means and said master station receiving means.

* * * * *